United States Patent
Kojima

(10) Patent No.: US 7,588,293 B2
(45) Date of Patent: Sep. 15, 2009

(54) VEHICLE WALK-IN DEVICE

(75) Inventor: Yasuhiro Kojima, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 309 days.

(21) Appl. No.: 11/594,927

(22) Filed: Nov. 9, 2006

(65) Prior Publication Data

US 2007/0120407 A1    May 31, 2007

(30) Foreign Application Priority Data

Nov. 29, 2005    (JP) .............................. 2005-343827

(51) Int. Cl.
*B60N 2/06* (2006.01)

(52) U.S. Cl. .................... 297/344.1; 297/341

(58) Field of Classification Search ................. 297/341, 297/344.11, 344.1
See application file for complete search history.

(56) References Cited

U.S. PATENT DOCUMENTS

| | | | | |
|---|---|---|---|---|
| 3,940,182 A | * | 2/1976 | Tamura ........................ 297/341 |
| 4,101,169 A | * | 7/1978 | Muraishi et al. ............. 297/341 |
| 4,648,657 A | * | 3/1987 | Cox et al. .................... 297/341 |
| 4,742,983 A | * | 5/1988 | Nihei ........................... 248/429 |
| 5,052,751 A | * | 10/1991 | Hayakawa et al. ........... 297/341 |
| 5,137,331 A | * | 8/1992 | Colozza ........................ 297/341 |
| 5,964,442 A | * | 10/1999 | Wingblad et al. ............ 248/429 |
| 6,102,478 A | * | 8/2000 | Christopher ................. 297/341 |
| 6,341,819 B1 | * | 1/2002 | Kojima et al. ................ 297/341 |
| 6,416,130 B2 | * | 7/2002 | Yamada et al. .......... 297/344.11 |
| 6,513,868 B1 | * | 2/2003 | Tame ........................... 297/341 |
| 6,767,063 B1 | * | 7/2004 | Abdella et al. .......... 297/378.12 |
| 2004/0262969 A1 | * | 12/2004 | Sasaki et al. ............ 297/344.11 |

FOREIGN PATENT DOCUMENTS

JP    10-35331 A    2/1998

* cited by examiner

*Primary Examiner*—Peter R Brown
*Assistant Examiner*—Patrick Lynch
(74) *Attorney, Agent, or Firm*—Buchanan Ingersoll & Rooney PC

(57) ABSTRACT

A vehicle walk-in device includes a fixed rail, a first lock member, a second lock member, a main mechanism, a sub mechanism, and a transmitting mechanism, the main mechanism having a first drive member, a first release link, and a link connecting shaft, the sub mechanism including a second release link actuated in conjunction with the first release link by means of the transmitting mechanism so that the second lock member is pressed so as to be unlocked and the transmitting mechanism made of a flexible cord-shaped member.

7 Claims, 13 Drawing Sheets

VEHICLE WALK-IN DEVICE

CROSS REFERENCE TO RELATED APPLICATIONS

This application is based on and claims priority under 35 U.S.C. § 119 to Japanese Patent Application 2005-343827, filed on Nov. 28, 2005, the entire content of which is incorporated herein by reference.

FIELD OF THE INVENTION

The present invention relates to a vehicle walk-in device increasing a space in conjunction with a tilting operation of a seat back of a vehicle seat so that a passenger smoothly gets in and out of the vehicle.

BACKGROUND

A known vehicle walk-in device disclosed in JP10035331A slides a seat in conjunction with a tilting operation of a seat back of the seat in order to increase a space so that a passenger smoothly gets in and out of the vehicle.

The known vehicle walk-in device includes a first lock member, a second lock member, a main mechanism and a sub mechanism. Specifically, the first lock member, provided at one side of the seat in a seat width direction, unlocks the seat so as to slide on the fixed rail, the second lock member, provided at the other side of the seat in a seat width direction, also unlocks the seat so as to slide on the fixed rail, the main mechanisms, provided at the one side of the seat in a seat width direction, unlocks the first lock member in conjunction with the tilting operation of the seat back of the seat, and the sub mechanism unlocks the second lock member in conjunction with the operation of the main mechanism.

In this configuration, the above mentioned unlocking operation in conjunction with the tilting operation of the seatback is performed by only the main mechanism provided at the one side of the seat, and an operation of the main mechanism is transmitted to the sub mechanism by means of a link mechanism. However, the configuration of the link mechanism is generally complicated, and such mechanism requires a large space to be mounted. This results in complicating a mechanism of the vehicle walk-in device, and the design thereof is restricted.

Further, at the time of the walk-in operation is performed, once the seat back of the seat is tilted, the main mechanism is actuated. Then, an operation of a first release link of the main mechanism is transmitted to a second release link of the sub mechanism. At this point, a loss in the transmitted operation transmitting may be caused by, for example, a size tolerance, a clearance tolerance and an assembling tolerance. Thus, the actuation of the second release link of the sub mechanism may delay comparing to the actuation of the first release link of the main mechanism, and there is a limit to enhance a synchronism between the main mechanism and the sub mechanism.

Further, a load generating an excessive stroke at the first release link and the second release link may be applied thereto.

A need thus exists to provide a vehicle walk-in device having a simple configuration, enhancing the synchronism and reducing a load generating an excessive stroke.

SUMMARY OF THE INVENTION

According to an aspect of the present invention, a vehicle walk-in device comprises a fixed rail on which a seat slides, a first lock member provided at one side of the seat in a seat width direction for locking the seat so as not to slide relative to the fixed rail and for unlocking the seat so as to slide relative to the fixed rail, a second lock member provided at the other side of the seat in the seat width direction for locking the seat so as not to slide relative to the fixed rail and for unlocking the seat so as to slide relative to the fixed rail, a main mechanism provided at the one side of the seat and unlocking the first lock member in conjunction with an operation of a seat back of the seat, a sub mechanism provided at the other side of the seat and unlocking the second lock member in conjunction with an actuation of the main mechanism, a transmitting mechanism provided between the main mechanism and the sub mechanism and transmitting an operation of the main mechanism to the sub mechanism; the main mechanism including: a first drive member actuated in conjunction with the operation of the seat back of the seat, a first release link actuated in conjunction with the first drive member so as to press the first lock member to be unlocked; and a link connecting shaft by which the first drive member is relative-rotatably connected to the first release link: the sub mechanism including a second release link actuated in conjunction with the first release link by means of the transmitting mechanism so that the second lock member is pressed so as to be unlocked; and the transmitting mechanism made of a flexible cord-shaped member and disposed in a manner where one end of the flexible cord-shaped member in a longitudinal direction thereof is connected to the link connecting shaft used for connecting the first drive member and the first release link in the main mechanism, and the other end of the flexible cord-shaped member in a longitudinal direction thereof is connected to the second release link of the sub mechanism.

According to another aspect of the present invention, a vehicle walk-in device comprises a fixed rail on which a seat slides, a first lock member provided at one side of the seat in a seat width direction for locking the seat so as not to slide relative to the fixed rail and for unlocking the seat so as to slide relative to the fixed rail, a second lock member provided at the other side of the seat in a seat width direction for locking the seat so as not to slide relative to the fixed rail and for unlocking the seat so as to slide relative to the fixed rail, a main mechanism provided at the one side of the seat and unlocking the first lock member in conjunction with an operation of a seat back of the seat, a sub mechanism provided at the other side of the seat and unlocking the second lock member in conjunction with an actuation of the main mechanism, a transmitting mechanism provided between the main mechanism and the sub mechanism and transmitting an operation of the main mechanism to the sub mechanism, the main mechanism including: a first drive member actuated in conjunction with the operation of the seat back of the seat, a first release link actuated in conjunction with the first drive member so as to press the first lock member to be unlocked; a link connecting shaft by which the first drive member is relative-rotatably connected to the first release link; and a first biasing member biasing the first release link in an opposite direction of an unlocking direction: and the sub mechanism including: a second release link actuated in conjunction with the first release link by means of the transmitting mechanism so that the second lock member is pressed so as to be unlocked; and a second biasing member biasing the second release link in the unlocking direction.

According to further aspect of the present invention, a vehicle walk-in device comprises a fixed rail on which a seat slides, a first lock member provided at one side of the seat in a seat width direction for locking the seat so as not to slide relative to the fixed rail and for unlocking the seat so as to slide relative to the fixed rail, a second lock member provided at the other side of the seat in a seat width direction for locking the seat so as not to slide relative to the fixed rail and for unlocking the seat so as to slide relative to the fixed rail, a main mechanism provided at the one side of the seat and unlocking the first lock member in conjunction with an operation of a seat back of the seat, the main mechanism including a first drive member actuated in conjunction with the operation of the seat back of the seat, a first release link actuated in conjunction with the first drive member so as to press the first lock member to be unlocked; and a link connecting shaft by which the first drive member is relative-rotatably connected to the first release link: the first release link is biased by means of a first biasing member in an opposite direction of an unlocking direction; and the first biasing member serving as a stopper for restricting the first release link so as not to be rotated excessively.

BRIEF DESCRIPTION OF THE DRAWINGS

The foregoing and additional features and characteristics of the present invention will become more apparent from the following detailed description considered with reference to the accompanying drawings, wherein:

FIG. 14A illustrates a side view indicating a position memorizing mechanism including a slider, a rail, a canceling lever and the like;

FIG. 14B illustrates a side view indicating a position memorizing mechanism including a slider, a rail, a canceling lever and the like;

FIG. 14C illustrates a side view indicating a position memorizing mechanism including a slider, a rail, a canceling lever and the like; and FIG. 14D illustrates a side view indicating a position memorizing mechanism including a slider, a rail, a canceling lever and the like.

DETAILED DESCRIPTION

Figure 1:
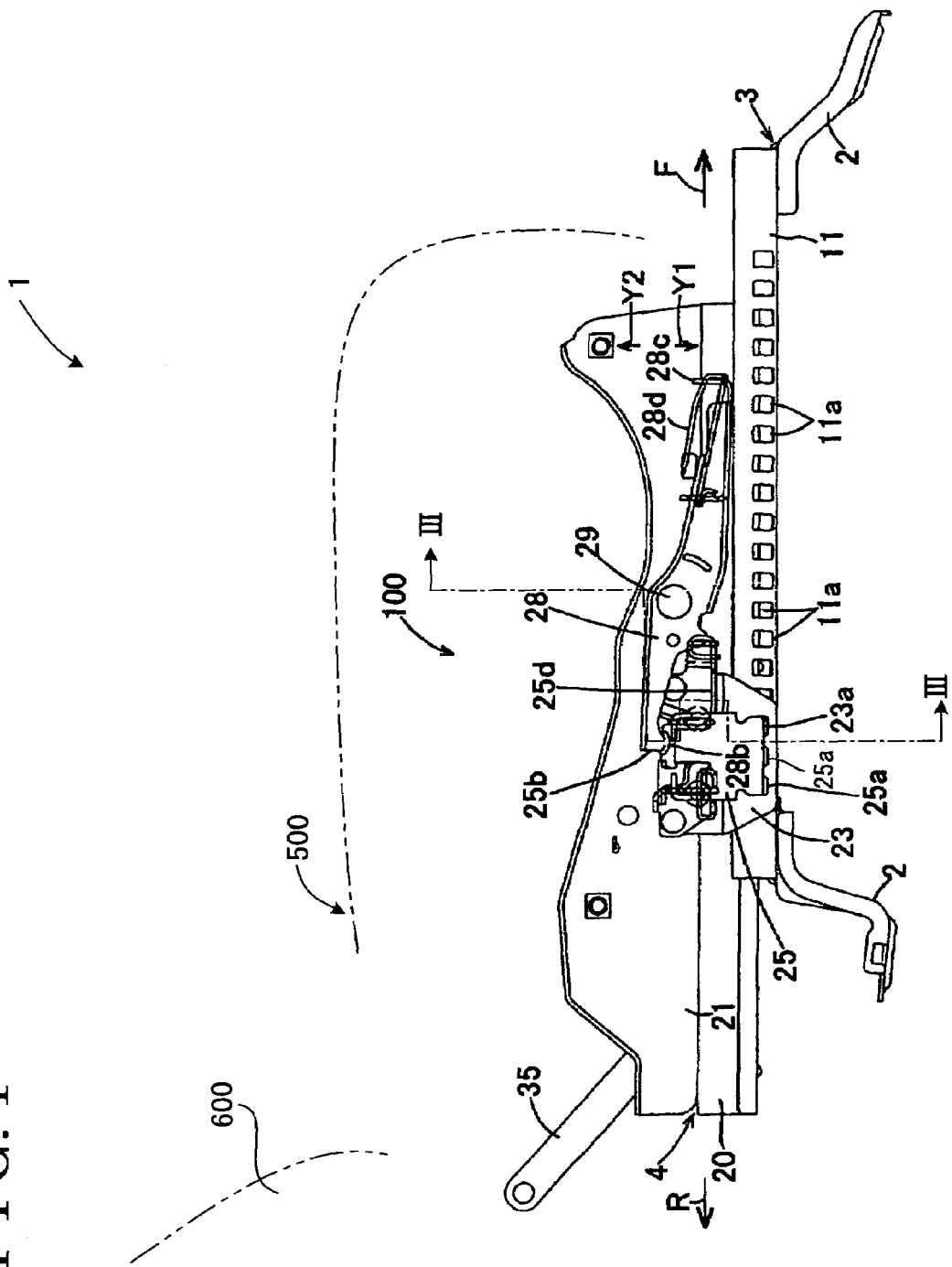
FIG. 1 illustrates a side view of a main mechanism seen from one side.

A fixed rail has a function to slide a seat thereon. This function may be provided at one side of the fixed rail in a seat width direction, and an upper rail or the like may be attached to the seat, and the upper rail may slide on the fixed rail. A first lock member functions to lock and unlock the seat relative to the fixed rail. A second lock member functions to lock and unlock the seat relative to the fixed rail at the other side of the seat in a seat width direction.

An operation force of the walk-in operation actuates the main mechanism, and the operation force of the walk-in operation is transmitted from the main mechanism to a sub mechanism.

The main mechanism is provided at the one side of the seat in a seat width direction in order to unlock the first lock member in conjunction with the tilting operation of the seat back of the seat.

The sub mechanism is provided at the other side of the seat in a seat width direction in order to unlock the second lock member in conjunction with the actuation of the main mechanism.

A transmitting mechanism is provided between the main mechanism and the sub mechanism for transmitting the operation at the main mechanism to the sub mechanism.

Further, the main mechanism further includes a first drive member, for example a drive link or a cable, and a first release link. Specifically, the first drive member is actuated in conjunction with the tilting operation of the sat back of the seat, and then the first release link presses the first lock member so that the first lock member is unlocked. The main mechanism further includes a link connecting shaft, by which generally the first drive member is connected to the first release link so as to be rotatable. The sub mechanism includes a second release link pressing the second lock member so as to be unlocked in conjunction with the operation transmitted from the main mechanism by means of the transmitting mechanism.

The transmitting mechanism is a flexible cord-shaped member having a deformable characteristic, and one end portion of the flexible cord-shaped member in a longitudinal direction thereof is connected to a link connecting shaft of the first release link of the main mechanism, and the other end portion of the flexible cord-shaped member is connected to the second release link of the sub mechanism. The flexible cord-shaped member includes a ring portion at the one end portion in a longitudinal direction thereof. The flexible cord-shaped member is relative rotatably connected to the link connecting shaft in a manner where the ring portion fits an outer peripheral surface of the link connecting shaft. One of a cable, a wire, a string, a lope and a chain is used as the flexible cord-shaped member. The link connecting shaft is fitted to the first release link so as not to rotate, or is fixed to the first release link by welding. Because the link connecting shaft is restricted so as not to rotate, a rotary displacement of the flexible cord-shaped member caused by the rotation of the link connecting shaft is reduced.

An attachment hole formed in a non-perfect circle shape is formed on the first release link of the main mechanism, and the link connecting shaft is fitted into the attachment hole. In order to prevent the link connecting shaft from being rotated while being fitted into the attachment hole, a shaft portion of the link connecting shaft is formed in a non-perfect circle shape.

The first release link of the main mechanism includes a first contact portion pressing the first lock member so as to be unlocked, the second release link of the sub mechanism includes a second contact portion pressing the second lock member so as to be unlocked. Further, the first release link of the main mechanism includes a first contact portion by which the first lock member is pressed so as to be unlocked, and the second release link of the sub mechanism includes a second contact portion by which the second lock member is pressed so as to be unlocked.

At an initial position of an unlocking operation, a first clearance is defined between the first contact portion and the first lock member of the main mechanism, and at the initial position of the unlocking operation, the sub mechanism is configured in a manner where, the second contact portion of the sub mechanism contacts the second lock member of the sub mechanism, or a second clearance, which is smaller than the first clearance, is defined between the second contact portion and the second lock member of the sub mechanism.

One of/each of the first biasing member and the second biasing member serves as a stopper for restricting one of/each of the first release link and the second release link so as not to rotate excessively. Thus, even when an excessive stroke is applied to one of/each of the first release link and the second release link, one of/each of the first release link and the second release link is prevented from being rotated excessively, as a result, the walk-in device is operated appropriately.

One of/each of the first biasing member and the second biasing member is a torsion coil spring having a coil spring and an arm portion continues to the coil spring, and the arm portion of the torsion coil spring serves as a stopper for restricting one of/both of the first release link and the second release link so as not to rotate excessively. Because the arm portion of the torsion coil spring has a spring-elastic characteristic, the first release link is prevented from being intensely contacting the arm portion. Further, an elastic force to move each of the first release link and the second release link toward its initial position is generated at the arm portion. One of/each of the first release link and the second release link is formed so as to have a stopper portion contacting the arm portion of the torsion coil spring.

Further, the main mechanism further includes a position memorizing mechanism memorizing a position of the seat relative to the fixed rail and a canceling member canceling the memorized position by the position memorizing mechanism by operating the operating member. Specifically, the position memorizing mechanism includes a rail and a slider, the rail provided along the fixed rail and including plural lock portions and the slider provided slidably along the rail so as to be locked and unlocked relative to the lock portion of the rail.

An embodiment of the present invention will be explained in accordance with the attached drawings. According to the embodiment of the present invention, a seat apparatus 1 of a seat 500 of a vehicle includes a seat slide mechanism and a walk-in mechanism. Generally, the walk-in mechanism is operated for the purpose of moving a front seat (seat 500) of a vehicle in order to increase a space between the front seat and the rear seat so that a passenger smoothly gets in and out of a rear seat of the vehicle. Specifically, when the passenger gets in and out of the rear seat, a seat back 600 of the front seat (seat 500) is tilted forward. At this point, the upper rail is released (unlocked) from a lower rail, which is fixed on the vehicle floor, so that the upper rail slides relative to the lower rail in a front direction in order to increase a space.

In this configuration, the seat apparatus 1 further includes a position memorizing mechanism for memorizing an initial position of the front seat. When the seat moved forward is tilted backward, a stopper, which is provided at the side of the seat, contacts the position memorizing mechanism so that the seat is stopped at the initial position memorized by the position memorizing mechanism.

Figure 2:
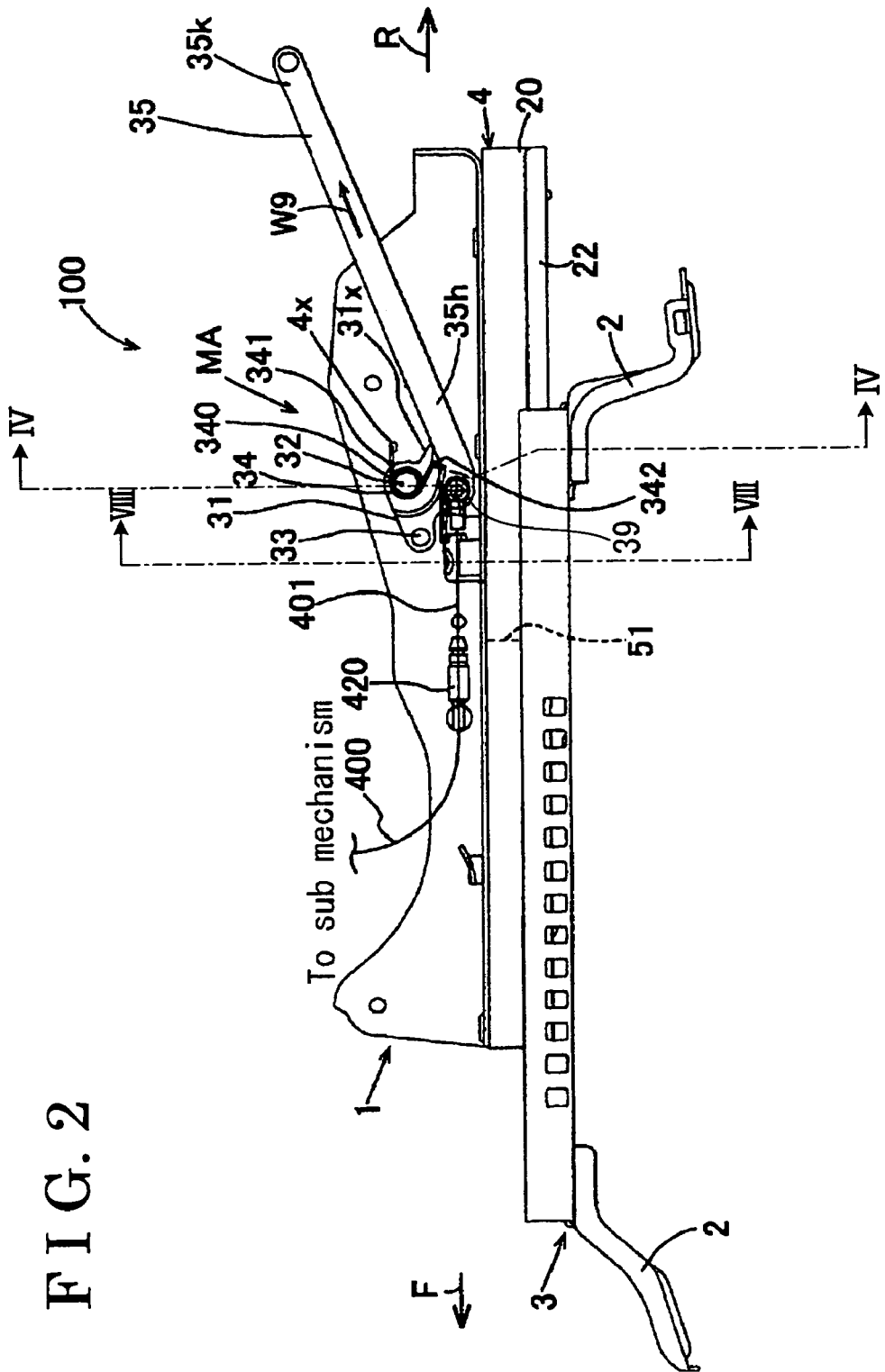
FIG. 2 illustrates a side view of the main mechanism seen from the other side.

FIGS. 1 through 4 illustrate a main mechanism 100 to which an operation force by the user is applied. FIG. 1 illustrates an inner side of the main mechanism 100, and FIG. 2 illustrates an outer side of the main mechanism 100. Specifically, FIG. 1 and FIG. 2 illustrate side views of the main mechanism 100 indicating a bone structure of a vehicle seat apparatus 1 mounted to a front seat of the vehicle such as an automobile. More specifically, in FIG. 1 and FIG. 2, the main mechanism 100 is provided at left hand, facing forward, of the seat in a seat width direction. Specifically, FIG. 1 illustrates a side view seen from inside of the seat, and FIG. 2 illustrates a side view seen from outside of the seat. A main mechanism 100 provided at the right hand of the vehicle seat has approximately the same structure as that of the main mechanism 100 provided at the left hand.

Figure 3:
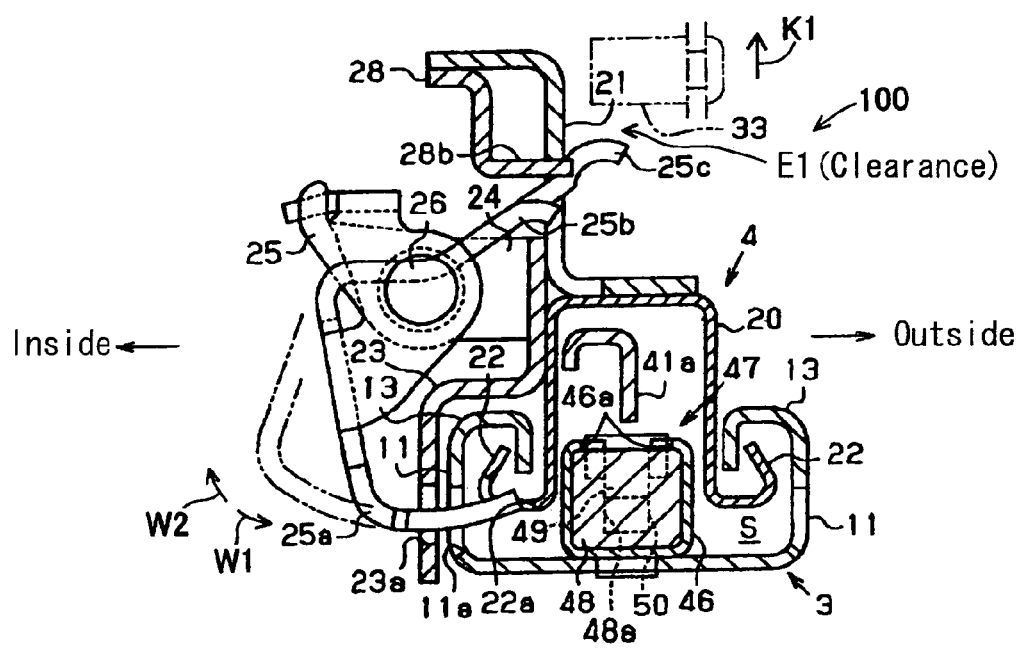
FIG. 3 illustrates a cross sectional view along a III-III line in FIG. 1.

As illustrated in FIGS. 1 and 2, a lower rail 3, serving as a fixed rail, is fixed on, for example a vehicle floor, by means of a pair of brackets 2. The lower rail 2 is provided so as to extend in a longitudinal direction of the vehicle. As shown in FIG. 3, the lower rail 3 includes an approximately ring-shaped cross section having a bottom 12 and a pair of side walls 11, which are upright from lateral ends of the bottom 12. Each side wall 11 continuously extends upward and forms at an end a first turned wall portion 13 that is bent laterally inward and is turned downward towards a base end of the side wall 11. Thus, in the approximately ring-shaped cross section, the lower rail 3 defines a housing space S inside thereof.

An upper rail 4 is fixed to a seat cushion frame (not illustrated), which forms a structure of the seat cushion of the seat, so as to move together with the seat. The upper rail 4 extends in the vehicle longitudinal direction. Specifically, as illustrated in FIG. 3, the upper rail 4 includes a wall 20, which includes an approximately ring shaped cross section and opens downward, and a supporting wall 21, which is fixed to an upper surface of the wall 20 and extends in a vertical direction. The wall 20 is positioned so as to be interposed in a lateral direction between both of the first turned wall portions 13 of the lower rail 3. The wall 20 continuously extends downward and forms second turned wall portions 22, which are bent laterally outward and are turned so as to be surrounded by the side walls 11 and the first turned wall portions 13.

Figure 4:
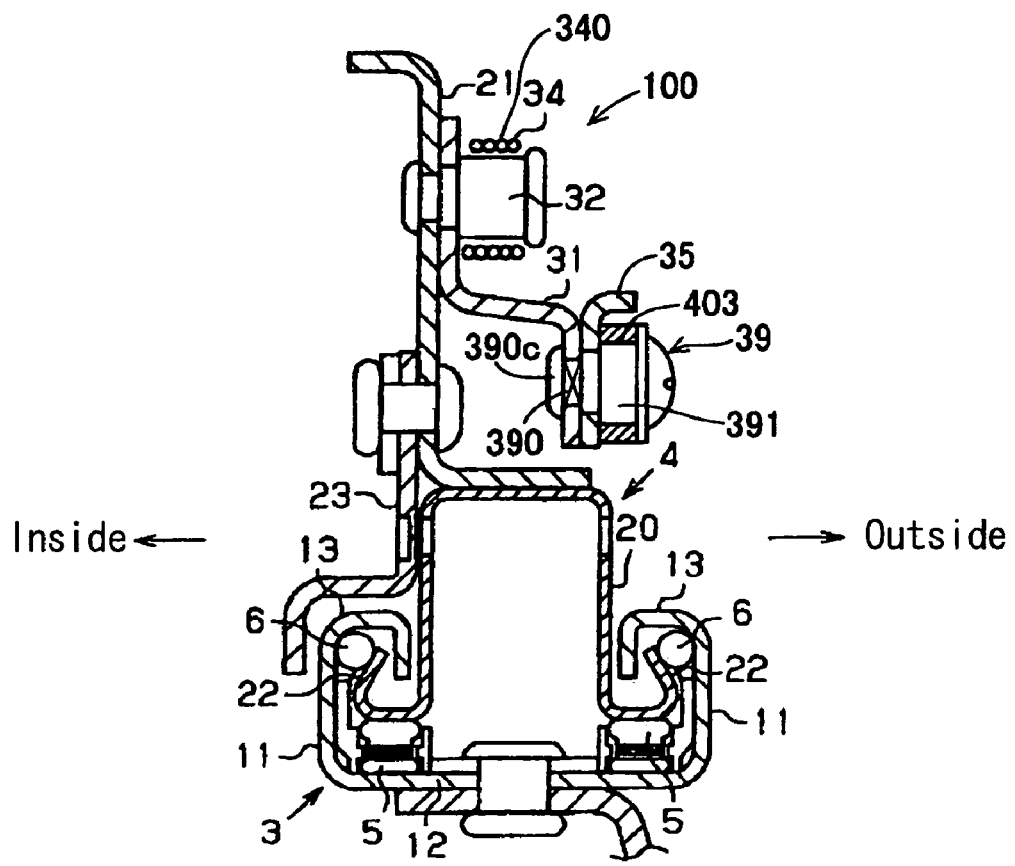
FIG. 4 illustrates a cross sectional view along a IV-IV line in FIG. 2.

As shown in FIG. 4, the upper rail 4 is supported by the lower rail via plural rollers 5 provided between the bottom 12 of the lower rail 3 and the upper rail 4. The upper rail 4 is engaged via balls 6 with the first turned wall portions 13 that face the tip ends of the second turned wall portions 22. In this configuration, the upper rail 4 is freely slidably supported relative to the lower rail 3 in a longitudinal direction in a manner where the rollers 5 are rolling between the upper rail 4 and the lower rail 3. Specifically, the upper rail 4 at the side of the seat is movable relative to the lower rail 3, as a result, the seat fixed to the upper rail 4 slides forward (an arrow F direction in FIG. 1) and backward (an arrow R direction in FIG. 1) relative to the vehicle floor on which the lower rail 3 is fixed.

As illustrated in FIG. 3, the lower rail 3 includes the side walls 11, one is located at the inside of the seat in a seat width direction, and the other one is located at the outside of the seat in a seat width direction. On the side wall 11 located at the inside of the seat in a seat width direction, plural lock holes 11a are formed in a manner where the plural lock holes 11a are longitudinally aligned and are spaced at a predetermined interval to an adjacent one of each. In the same way, the upper rail 4 includes the second turned wall portions 22, one is located at the inside of the seat in a seat width direction, the other one is located at the outside of the seat in a seat width direction. On the second turned wall portion 22 located at the inside of the seat in a seat width direction, plural insertion holes 22a are formed. The insertion holes 22a are arranged so as to mate with the plural adjacent lock holes 11a, for example with the three adjacent lock holes 11a. As further illustrated in FIG. 3, an auxiliary plate 23 is tightly secured to an inner surface of the supporting wall 21 in a seat width direction. At the auxiliary plate 23, plural adjacent lock holes 23a are formed so as to mate with the plural adjacent lock holes 11a, for example the three adjacent lock holes 11a.

As illustrated in FIG. 3, the upper rail 4 is secured with a bracket 24 together with the auxiliary plate 23. A first slide lock plate 25, serving as a lock member, is pivotally supported by a pivot pin 26. At the first slide lock plate 25, plural detents 25a, for example three detents 25a, are formed. As the first slide lock plate 25 pivots in a locking direction, which is indicated with an arrow W1, the detents 25a are inserted into the through holes 23a and the insertion holes 22a. On the other hand, as the first slide lock plate 25 pivots in an unlocking direction, which is indicated with an arrow W2, the detents 25a are unlocked from the through holes 23a and the insertion holes 22a. The detents 25a are inserted into, and unlocked from the adjacent lock holes 11a, for example three lock holes 11a, in association with insertion into and releasing from the through holes 23a and the insertion holes 22a.

More specifically, as the first slide lock plate 25 pivots in the locking direction, which is indicated with the arrow W1, the detents 25a are inserted into the through holes 23a, the lock holes 11a and the insertion holes 22a towards the first turned wall portion 13. The upper rail 4 is then locked with the lower rail 3 so that a relative movement between the lower rail 3 and the upper rail 4 are prohibited. The lock holes 11a are then firmly latched with the detents 25a inserted into the through holes 23a and the insertion holes 22a. Therefore, the upper rail 4 is retained at a predetermined position within a movement range relative to the lower rail 3 so that the seat supported by the upper rail 4 is positioned in a longitudinal direction of the vehicle.

Figure 5:
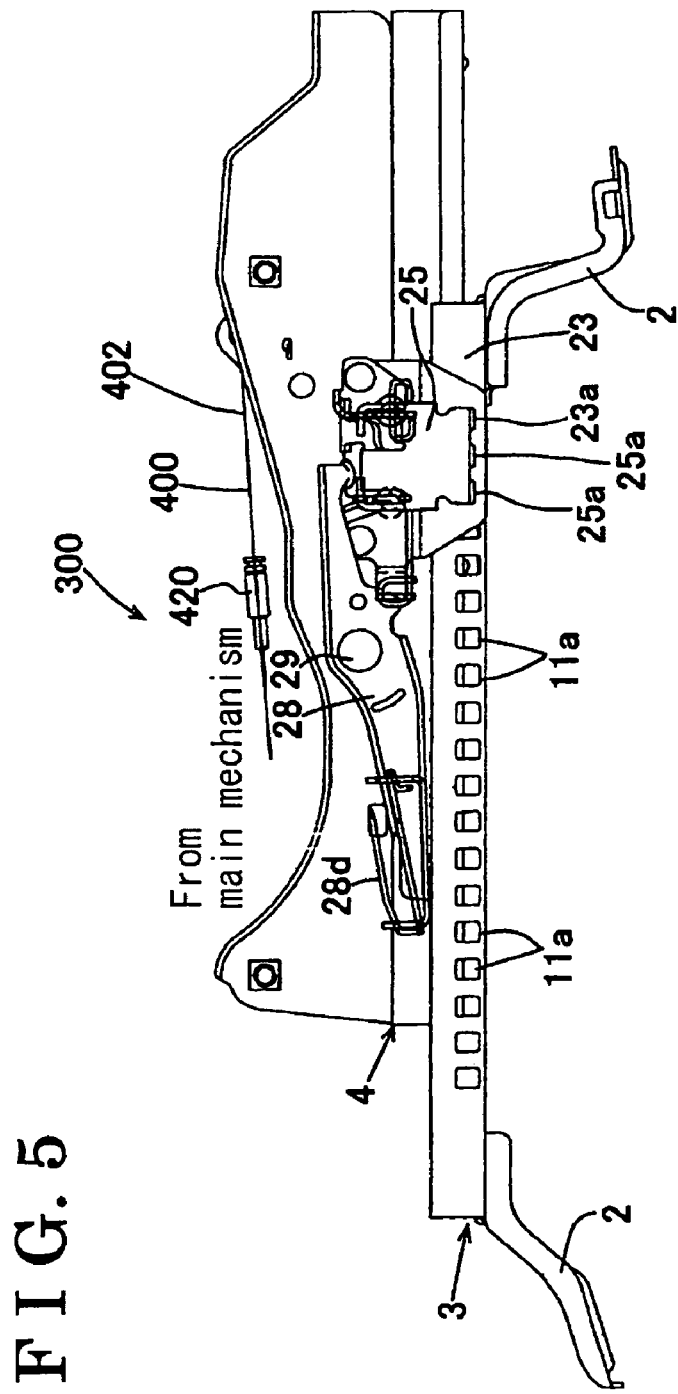
FIG. 5 illustrates a side view of a sub mechanism seen from the one side.

The first slide lock plate 25 is typically biased in the locking direction by means of a spring 25d, illustrated in FIG. 1, installed around the pivot pin 25. Therefore, the detents 25a of the first slide lock plate 25 are typically biased to pivot in a direction to be inserted into the lock holes 11a in the locking direction indicated with the arrow W1. As illustrated in FIG. 5, a contact flange 25b is formed at the slide position lock plate 25 so as to face the detents 25a relative to the pivot pin 26.

As illustrated in FIG. 1, a slide unlock operation lever 28, serving as an operating member, is tightly secured to an inner surface of the supporting wall 21 of the upper rail 4 in a seat width direction. The slide unlock operation lever 28 is pivotally supported by a pin 29 at an approximately longitudinally central portion thereof. As illustrated in FIG. 1, a contact flange 28b is formed at a rear end of the slide unlock operation lever 28. The contact flange 28b is arranged so as to face and make a contact with the contact flange 25b of the first slide lock plate 25.

A supporting portion 28c is formed at a front end of the slide unlock operation lever 28. The supporting portion 28c of the slide lock releasing lever 28 supports an operation handle (not illustrated) operated by an operator. As the slide lock-releasing lever 28 is pivoted about the pin 29 in response to an operation of the operation handle, the contact flange 28b of the slide unlock operation lever 28 contacts the contact flange 25b of the slide position lock plate 25. As a result, the first slide lock plate 25 is pivoted in the unlocking direction, in other words, in a clockwise direction indicated by an arrow W2, against a biasing force of the spring 25d. The detents 25a are disengaged from the lock holes 11a, and the upper rail 4 is unlocked from the locked state. Therefore, the upper rail 4 becomes slidably movable along the lower rail 3.

Further, as shown in FIG. 3, a contact flange 25c is formed at first slide lock plate 25. The contact flange 25c faces the detents 25a in a manner where the pivot pin 26 is positioned therebetween. As illustrated in FIG. 3, the contact flange 25c extends in a manner where it passes through the supporting wall 21 of the upper rail 4 so as to protrude outward in a seat width direction.

A spring 28d illustrated in FIG. 1 typically applies a biasing force to the slide unlock operation lever 28 so as to pivot in a direction indicated with an arrow Y1. Specifically, the contact flange 28b is biased to apart from the contact flange 25b. In this configuration, when a user operates the operation handle, which is not illustrated, the slide unlock operation lever 28 is pivoted relative to the pin 29 in a direction indicated with an arrow Y2 in FIG. 1, against the biasing force applied by the spring 28d. Thus, by use of the slide unlock operation lever 28, the detents 25a are disengaged from the lock hole 11a, and the upper rail 4 is unlocked from the lower rail 3 so as to slide relative thereto. In this way, the seat is slidably moved and a position of the seat is adjusted with high precision.

As illustrated in FIG. 2, a walk-in mechanism MA of the seat apparatus includes a first drive link 35, serving as a first drive member, and a first release link 31. Specifically, the first drive link 35 is actuated in conjunction with a forward tilting operation of the seat back, and the first release link 31 unlocks the upper rail 4 so as to slide relative to the lower rail 3 in conjunction with a forward tilting operation of the seat back. The first drive link 35 serving as the first drive member may be formed of a cable as long as it can be actuated in conjunction with a forward tilting operation of the seat back.

The seat back faces the passenger's back when a passenger is seated on the seat. The first release lever 31 is supported at the outer surface of the supporting wall 21 in a seat width direction so as to pivot relative to a pin 32. The first release link 31 includes a link stopper portion 31x protruding outward. A first contact pin 33, serving as a first contact portion, is firmly attached to an end portion of the first release link 31 as illustrated in FIG. 2.

As illustrated in FIG. 3, the first contact pin 33 has a function to unlock the upper rail 4 so as to slide relative to the lower rail 3 and is arranged so as to face and contact the contact flange 25c of the first slide lock plate 25.

The first release link 31 is typically biased by a first torsion coil spring 34 provided around the pin 32 so as to rotate the first release link 31 in an opposite direction of the unlocking direction (in a direction indicated with an arrow K1 in FIG. 3, in other words, the first release link 31 is typically biased in a manner where the first contact pin 33 is apart from the contact flange 25c.

As a result, a clearance E1, serving as a first clearance, is defined at the main mechanism 100 between the first contact pin 33 and the contact flange 25c as illustrated in FIG. 3. Specifically, the clearance E1 is an allowance for the main mechanism 100.

Figure 6:
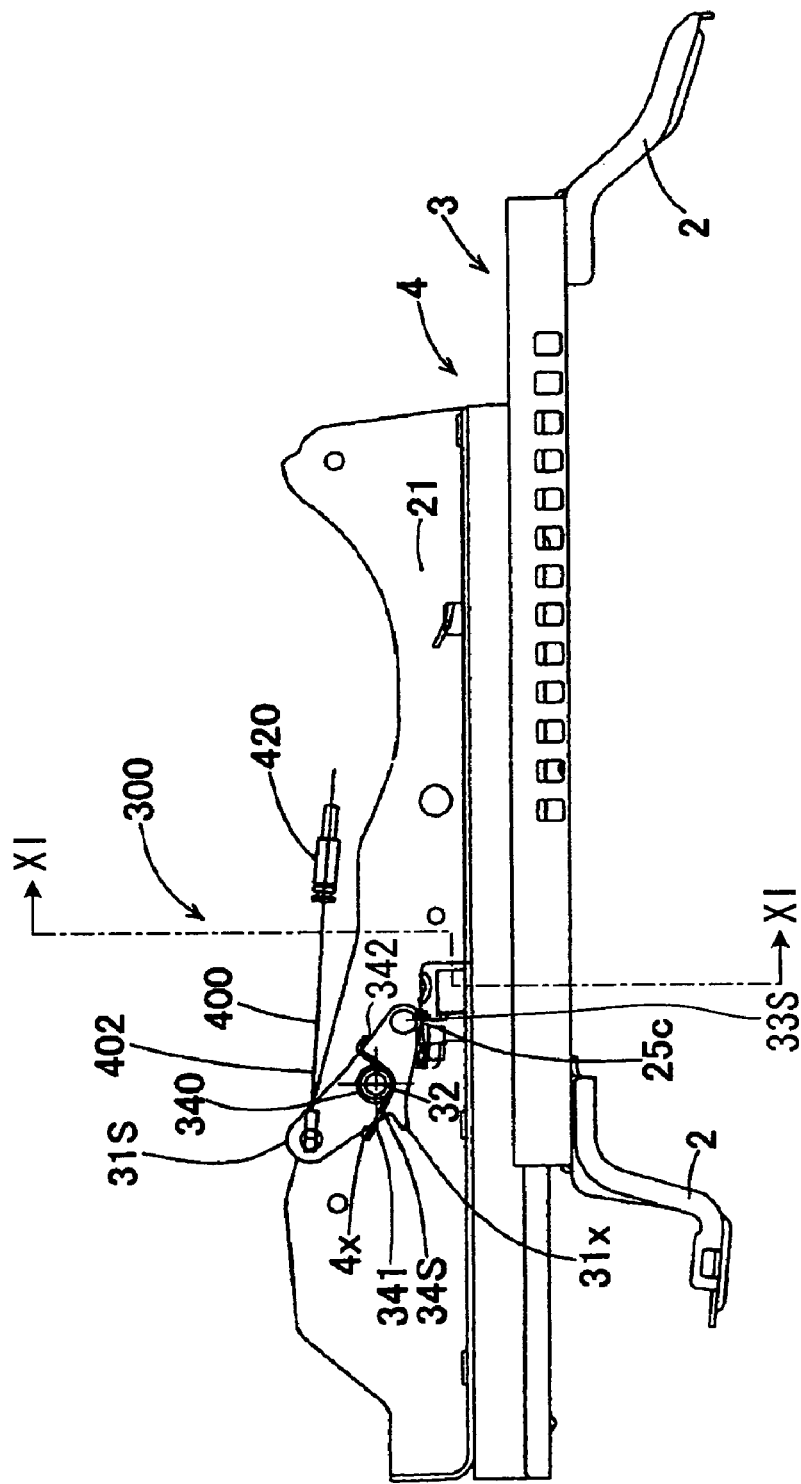
FIG. 6 illustrates a side view of the sub mechanism seen from the other side.

FIG. 5 illustrates a sub mechanism 300, provided at the other side of the seat in a seat width direction, seen from the inside of the vehicle seat apparatus 1, and FIG. 6 illustrates the sub mechanism 300 seen from the outside of the vehicle seat apparatus 1. The sub mechanism 300 basically has a similar configuration and working effects as the main mechanism 100. Specifically, the sub mechanism 300 is actuated in conjunction with the actuation of the main mechanism 100, and in this embodiment, the sub mechanism 300 is provided at right hand, facing forward, of the seat in a seat width direction. The sub mechanism 300 includes a second slide lock plate 25, serving as a second lock member, for locking the seat so as not to slide relative to the second lower rail 3, and for unlocking the seat so as to slide relative to the second lower rail 3. Because a structure and an actuation of the second slide lock plate 25 of the sub mechanism 300 is same as that of the first slide lock plate 25 of the main mechanism 100, explanation of the structure and the actuation of the second slide lock plate 25 will be skipped.

In this specification, the word "first" indicates members provided at the main mechanism 100, and the word "second" indicates members provided at the sub mechanism 300. As mentioned above, because the structure and the function of the main mechanism 100 is similar to that of the sub mechanism 200, same numerals are shared in order to make the explanation simpler. Some components such as a second release link 31S, a second torsion coil spring 34S and a second contact pin 33S uses "S" at the end of each numeral because components indicated by each numerals in the sub mechanism 300 are slightly different from that in the main mechanism 100.

As shown in FIG. 6, the second release link 31S is supported on the outer surface in a seat width direction by the supporting wall 21 of the upper rail 4 so as to pivot relative to a pin 32. At an end portion of the second release link 31S, a second contact pin 33S, serving as a second contact portion, is firmly fixed as illustrated in FIG. 6. The second contact pin 33S has a function to unlock the upper rail 4 so as to slide relative to the lower rail 2, the function being similar to that of the main mechanism 100. The second contact pin 33S faces the second slide lock plate 25 so as to contact the contact flange 25c thereof. The second release link 31S is typically biased in an unlocking direction by means of the second torsion coil spring 34S provided around the pin 32.

FIG. 7 illustrates the walk-in mechanism MA in the main mechanism 100. As illustrated in FIG. 7, one end 35h of the first drive link 35 is rotatably connected to the end portion of the first release link 31. A reclining plate 37 is rotatably supported at a seat cushion frame (not illustrated) by means of a pin 36. The other end 35k of the first drive link 35 is rotatably connected to a lever portion 37a of the reclining plate 37. An axis of the pin 36 is identical to a rotational axis of the seat back relative to the seat cushion. An engagement portion 37b is formed at the reclining plate 37 so as to extend towards the seat cushion. The engagement portion 37b is arranged to face an engagement portion 38, which is fixed to a seat back frame of the seat back. As the seat back frame is tilted relative to the seat cushion frame about the pin 36, the engagement portion 38 presses the engagement portion 37b.

Figure 7A:
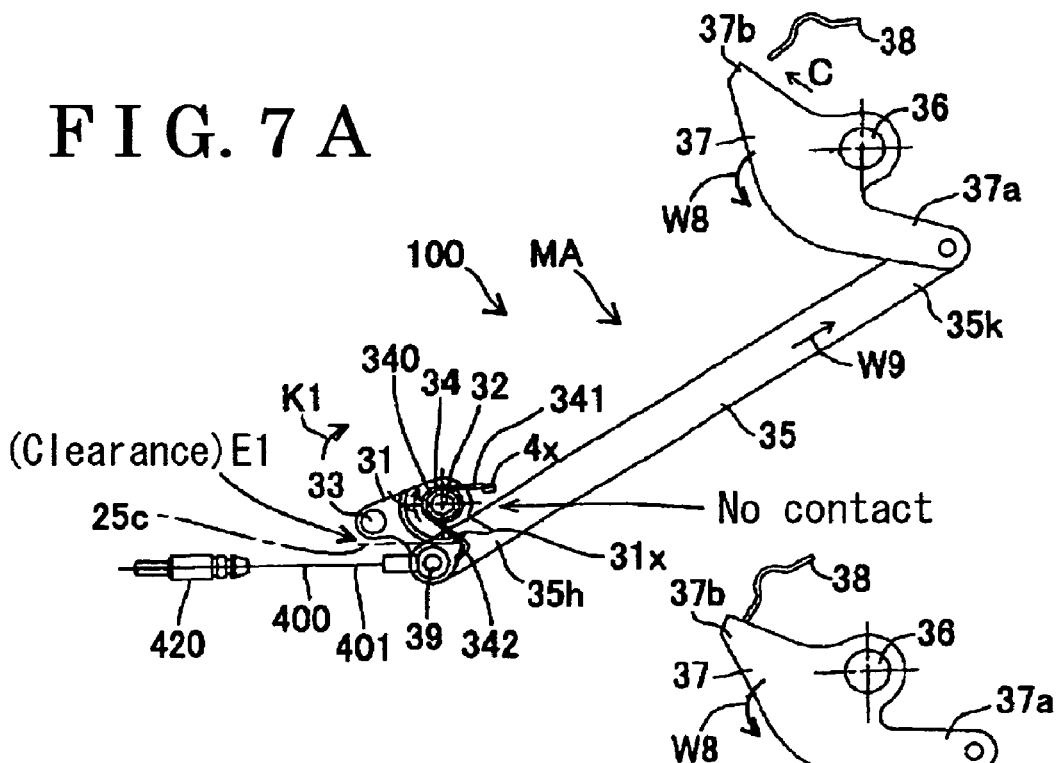
FIG. 7A illustrates a side view indicating main elements of a walk-in mechanism of the main mechanism.
Figure 7B:
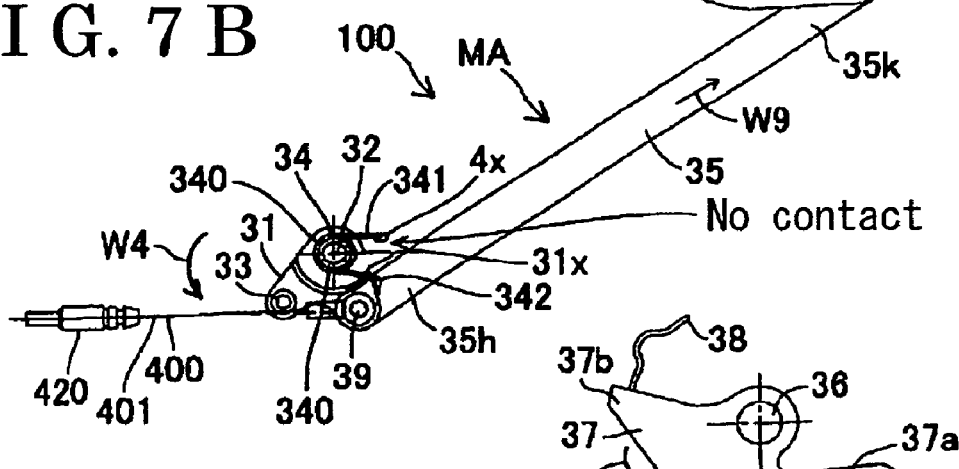
FIG. 7B illustrates a side view indicating main elements of the walk-in mechanism of the main mechanism.
Figure 7C:
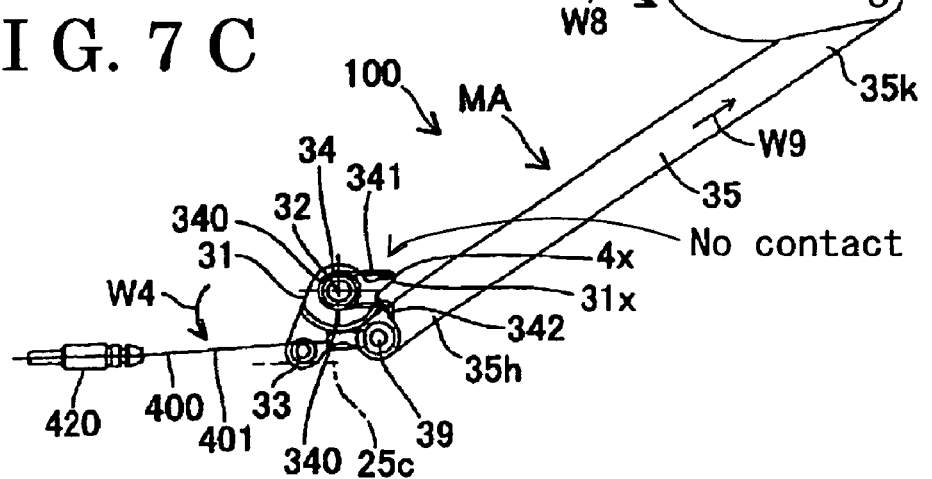
FIG. 7C illustrates a side view indicating main elements of the walk-in mechanism of the main mechanism.
Figure 8A:
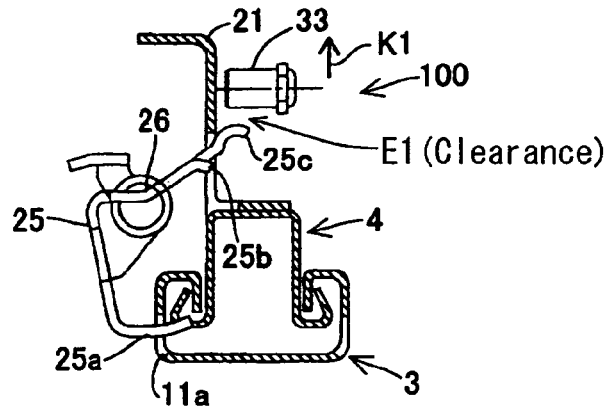
FIG. 8A illustrates a cross sectional view along VIII-VIII line indicating main elements of the walk-in mechanism of the main mechanism.

FIGS. 7A, 7B, 7C, 8A, 8B and 8C illustrate a walk-in operation performed by the main mechanism 100. Specifically, FIG. 7A and FIG. 8A illustrate an initial position of the walk-in operation. In the initial position, the seat back is positioned at a certain angle at which a passenger is generally seated on the seat. Specifically, in the initial position, a space C is defined between the engagement portion 37b and the engagement portion 38 as shown in FIG. 7A so that they are not interfered each other.

Figure 8B:
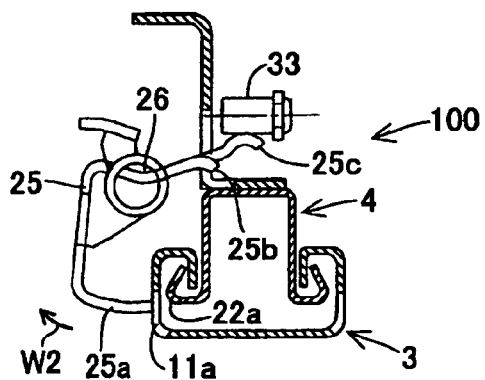
FIG. 8B illustrates a cross sectional view along VIII-VIII line indicating main elements of the walk-in mechanism of the main mechanism.

Further, at the initial position of the walk-in operation, as shown in FIG. 7A, a clearance E1 is defined between the first contact pin 33 and the contact flange 25c. Specifically, the clearance E1 is an allowance for the main mechanism 100. FIG. 7B and FIG. 8B illustrate a state in which the walk-in operation is in process. In this process, the seat back has been tilted in an unlocking direction.

Figure 8C:
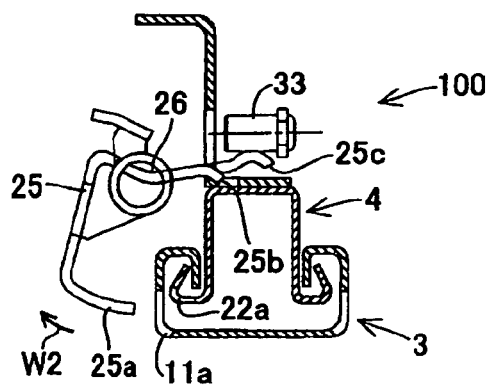
FIG. 8C illustrates a cross sectional view along VIII-VIII line indicating main elements of the walk-in mechanism of the main mechanism.

FIG. 7C and FIG. 8C illustrate a state in which the walk-in operation has been completed. Specifically, the first release link 31 is pivoted to a full-stroke position in an unlocking direction so that the upper rail 4 is unlocked from the lower rail 3. In this walk-in operation, the seat back is tilted forward so that an angle between the seat back and the seat cushion becomes smaller than a predetermined angle.

As shown in FIG. 7B and FIG. 7C, the engagement portion 38 presses the engagement portion 37b, as a result, the reclining plate 37 is rotated in an unlocking direction (in a direction illustrated with an arrow W8 in FIG. 7. In accordance with this rotation of the reclining plate 37, the first drive link 35 connected to the lever portion 37a is pulled up in a direction indicated with an arrow W9 n FIG. 7.

In this configuration, the first release link 31 is rotated, against the biasing force applied by the torsion coil spring 34, in an unlocking direction (in a direction indicated with an arrow W4 in FIG. 7) relative to the pin 32. Thus, as illustrated in FIG. 8A, 8B and 8C, the first contact pin 33 (first contact portion) of the first release link 31 presses the contact flange 25c of the first slide lock plate 25, and then the first slide lock plate 25 is rotated in an unlocking direction (a direction indicated with an arrow W2).

Figure 10A:
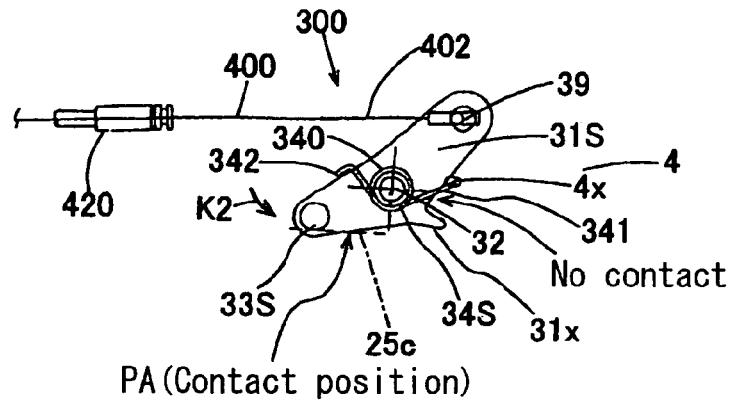
FIG. 10A illustrates a side view of a relevant part of the sub mechanism performing a walk-in operation.
Figure 10B:
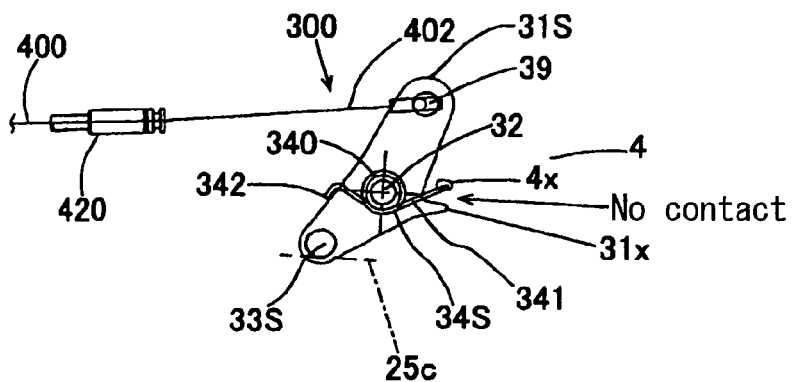
FIG. 10B illustrates a side view of a relevant part of the sub mechanism performing the walk-in operation.
Figure 10C:
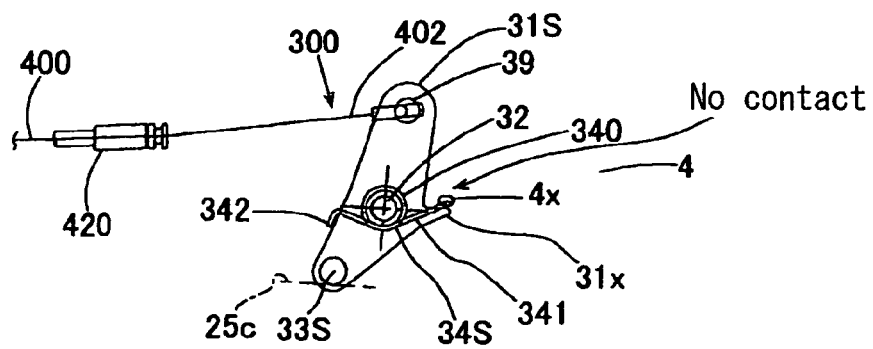
FIG. 10C illustrates a side view of a relevant part of the sub mechanism performing the walk-in operation.
Figure 11A:
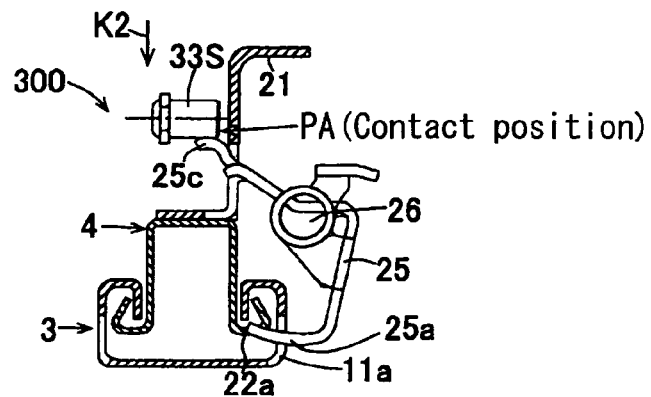
FIG. 11A illustrate a cross sectional view along a XI-XI line indicating a relevant part of the sub mechanism performing the walk-in operation.
Figure 11B:
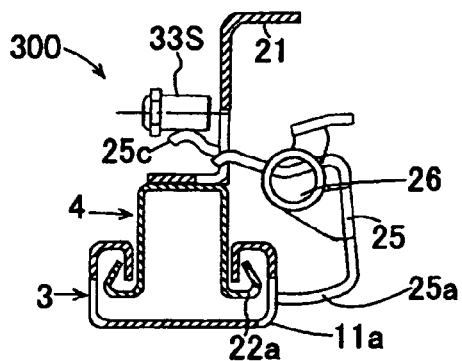
FIG. 11B illustrate a cross sectional view along the XI-XI line indicating a relevant part of the sub mechanism performing the walk-in operation.
Figure 11C:
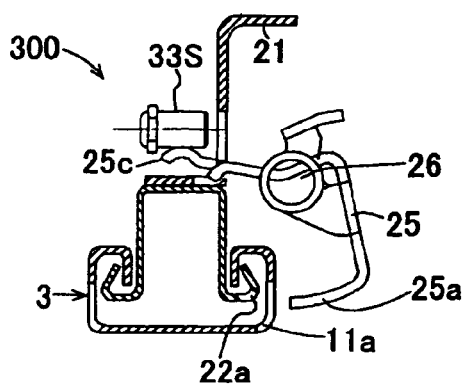
FIG. 11C illustrate a cross sectional view along the XI-XI line indicating a relevant part of the sub mechanism performing the walk-in operation.

FIGS. 10A, 10B, 10C, 11A, 11B and 11C illustrates a walk-in operation at the sub mechanism 300. FIGS. 10A and 11A illustrates an initial position of the walk-in operation. Specifically, at the initial position, the seat back is positioned at the certain angle at which the passenger is normally seated. At the initial position of the walk-in operation, as shown in FIG. 10A, there is no clearance between the second contact pin 33S (second contact portion) and the contact flange 25c, and a contact position PA is defined between the second contact pin 33S (second contact portion) and the contact flange 25c. FIGS. 10B and 11B illustrate a state in which the walk-in operation is in process. In this state, the seat back is tilted in an unlocking direction. FIGS. 10C and 11C illustrate a state in which the walk-in operation has been completed. Specifically, the second release link 31S is rotated to a full-stroke position in an unlocking direction so that the upper rail 4 is unlocked from the lower rail 3.

When the walk-in operation is performed, an operation of the first release link 31 of the main mechanism 100 needs to be transmitted to the second release link 31S of the sub mechanism 300. According to the embodiment, as shown in FIGS. 7A, 7B, 7C, 10A, 10B and 10C, the first release link 31 of the main mechanism 100 is connected to the second release link 31S of the sub mechanism 300 by means of a cable 400.

Figure 9:
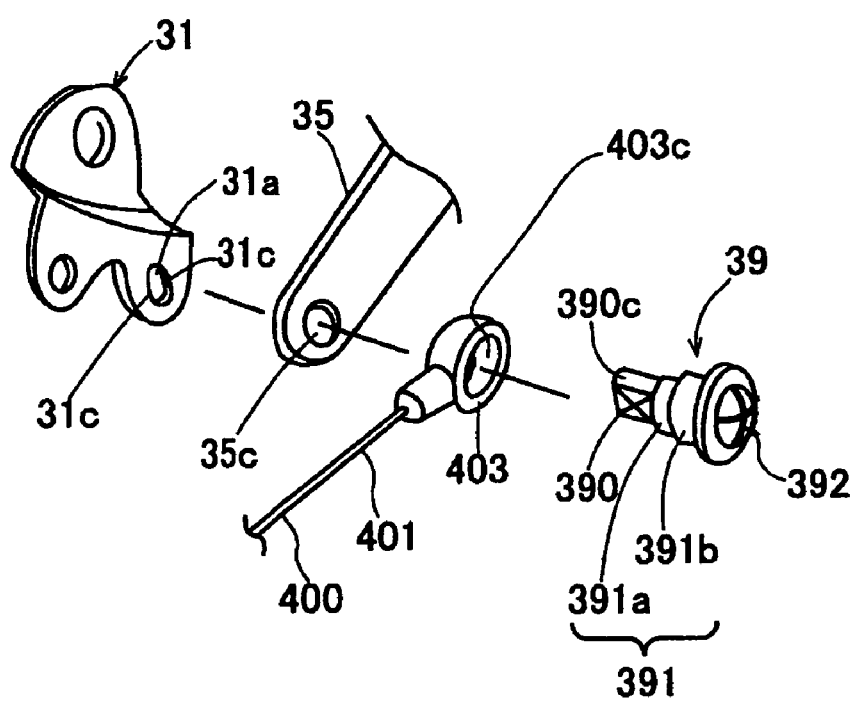
FIG. 9 illustrates an exploded perspective view indicating a structure for connecting a cable to the first release link.

The cable 400 (flexible cord-shaped member) serves as a transmitting mechanism and has a characteristic of flexibility. In the main mechanism 100, the cable 400 is guided by a cable guide 420. One end 401 of the cable 400 in a longitudinal direction thereof is connected to a link connecting shaft 39 of the first release link 31 of the main mechanism 100. Specifically, as shown in FIG. 9, the one end portion 401 of the cable 400 includes a ring portion 403 formed in a ring shape so as to has a through hole 403c. On the other hand, the link connecting shaft 39 includes a stopper portion 390 having a rectangular cross section, a ring shaped portion 391 (391a and 391b) and a screw portion 392. The ring portion 403 of the cable 400 fits to an outer peripheral surface of the link connecting shaft 39, and then the end portion 390c of the stopper portion 390 is caulked, so that, as shown in FIG. 4, the first release link 31 is connected to the first drive link 35 by means of the link connecting shaft 39. Thus, because the ring portion 403 of the cable 400 is connected to the ring shaped portion 391 of the link connecting shaft 39 so as to be relative rotatably each other. Thus, the deformability of the cable 400 is secured.

As shown in FIG. 9, an attachment hole 31a is formed on the first release link 31 so as to be in a non-perfect circle shape. Specifically, the attachment hole 31a, to which the link connecting shat 39 is attached, is formed in a long shape having two parallel sides 31c. The link connecting shaft 39 is attached to the first release link 31 as follows. The link connecting shaft 39 fits into and protrudes through the through hole 403c of the ring portion 403 of the cable 400, the through hole 35c formed at the end of the first drive link 35 and the attachment hole 31a of the first release link 31. Then, the end portion 390c of the link connecting shaft 39 is caulked. The link connecting shaft 39 is attached to the first release link 31 so as not to rotate relative to an axial of the link connecting shaft 39. In this configuration, the cable 400 is prevented from being excessively twisted, as a result, the walk-in mechanism MA can be maintained in good shape for a long time period.

As mentioned above, according to this embodiment, the one end portion 401 of the cable 400 is directly connected to the link connecting shaft 39 of the first release link 31 of the main mechanism 100. When the walk-in operation is performed, as shown in FIG. 7, because the first drive link 35 is pulled up in an unlocking direction (in a direction indicated by an arrow W9), the first release link 31 is rotated in an unlocking direction (in a direction indicated with an arrow W4), at the same time, the link connecting shaft 39 directly pulls the one end 401 of the cable 400. In this configuration, the responsibility of the cable 400 is improved, as a result, the responsibility of sub mechanism 300 is also be improved. The ring portion 403 of the cable 400 is relative rotatable about an axis of the ring shaped portion 391 of the link connecting shaft 39. Thus, even when a posture of the first drive link 35 is changed in a direction indicated with an arrow W4, the responsibility of the cable 400 is still secured.

The link connecting shaft 39 may be fixed to the first release link 31 by means of a welding (fusing means). When the link connecting shaft 39 is welded to the first release link 31, because the link connecting shaft is welded so as not to rotate, the link connecting shaft does not need to be formed in a rectangular shape in its cross section. The attachment hole 31a of the first release link 31 may not be formed in the long shape, and may be formed in a complete round shape.

As shown in FIG. 10, at the sub mechanism 300, the cable 40 is guided by the cable guide 420. The other end portion 402 of the cable 400 is connected to the second release link 31S of the sub mechanism 300 in a same manner as in the main mechanism 100. In the second release link 31S, a link corresponding to the first drive link 35 of the main mechanism 100 is not provided.

The other end portion 402 of the cable 400 in a longitudinal direction thereof is connected to the second release link 31S in a same manner as the one end portion 401. In this embodiment, the first release link 31 is connected to the first drive link 35 by means of the link connecting shaft 39, and further the cable 400 is connected to the first release link 31 in a manner where the link connecting shaft 39 fits into the 403 of the cable 400. Thus, the first release link 31 doesn't need to be changed in shape in order to connect the cable 400 thereto for interlocking each other, as a result, a space for the first release link 31 is reduced, and the costs can be reduced. Because the cable 40 is connected to the second release link 31S in the same manner as the first release link 31, same effects can be obtained at the sub mechanism 300.

As illustrated in FIG. 7, as mentioned above, the main mechanism 100 includes the first torsion coil spring 34 serving as the first biasing member applying a biasing force to the first release link 31 so as to rotated in an opposite direction of the unlocking direction (a direction indicated by an arrow K1). The first torsion coil spring 34 includes a coil spring 340, an arm portion 341 formed at one end portion of the first torsion coil spring 34 and an arm portion 342 formed at the other end portion of the first torsion coil spring 34. The arm portion 341 formed at the one end portion of the first torsion coil spring 34 engages an engagement hole 4X of the upper rail, and the arm portion 342 formed at the other end portion of the first torsion coil spring 34 engages the first release link 31. Thus, in an initial position of the walk-in operation shown in FIG. 8A and FIG. 3, the clearance E1 is formed between the first contact pin 33 of the main mechanism 100 and the engagement flange 25c of the first slide lock plate 25. As mentioned above, the clearance E1 serves as an allowance for the main mechanism 100.

According to the embodiment, when the walk-in operation is performed, an operation of the first release link 31 of the main mechanism 100 is transmitted to the second release link 31S of the sub mechanism 300 by means of the cable 400. However, in this configuration, an operation loss may be caused by, for example, a size tolerance, a clearance tolerance, an assembling tolerance, a looseness of the cable 400, may occurs. Especially, the cable 400 may be tensile in a longitudinal direction thereof. If the above mentioned loss occurs, the operation of the second release link 31S of the sub mechanism 300 may be delayed from the operation of the first release link 31 of the main mechanism 100. According to the embodiment, at the initial position of the walk-in operation, in the main mechanism 100, the clearance E1 is defined between the first contact pin 33 and the contact flange 25c of the first slide lock plate 25. Further, the second torsion coil spring 34S, serving as the second biasing member, is provided at the sub mechanism 300 so as to apply a biasing force to the second release link 31S in an unlocking direction (a direction indicated with an arrow K2). Furthermore, the arm portion 341 is formed at one end of the second torsion coil spring 34S, and the arm portion 342 is formed at the other end of the second torsion coil spring 34S. The arm portion 341 engages the engagement hole 4X of the upper rail 4, and the arm portion 342 engages the second release link 31S. Thus, as illustrates in FIG. 11A, the second contact pin 33S of the sub mechanism 300 contacts the contact flange 25c of the second slide lock plate 25 (contact position PA).

Therefore, in the initial position of the walk-in operation, because the clearance E1 (allowance) is defined at the main mechanism 100, and the second contact pin 33S of the sub mechanism 300 has already contacted the contact flange 25c of the second slide lock plate 25, in other words, at the initial position of the walk-in operation, even if the sub mechanism 300 generally delays from the main mechanism 100, the second release link 31S of the sub mechanism 300 has positioned ahead in the walk-in operation of the position of the first release link 31 of the main mechanism 100. In this configuration, the second release link 31S of the sub mechanism 300 is prevented from being delayed in its rotation comparing to that of the first release link 31 of the main mechanism 100. Thus, a level of a synchronism between the first release link 31 and the second release link 31S can be improved, and as a result, a level of a synchronism between the main mechanism 100 and the sub mechanism 300 can be improved.

Figure 12:
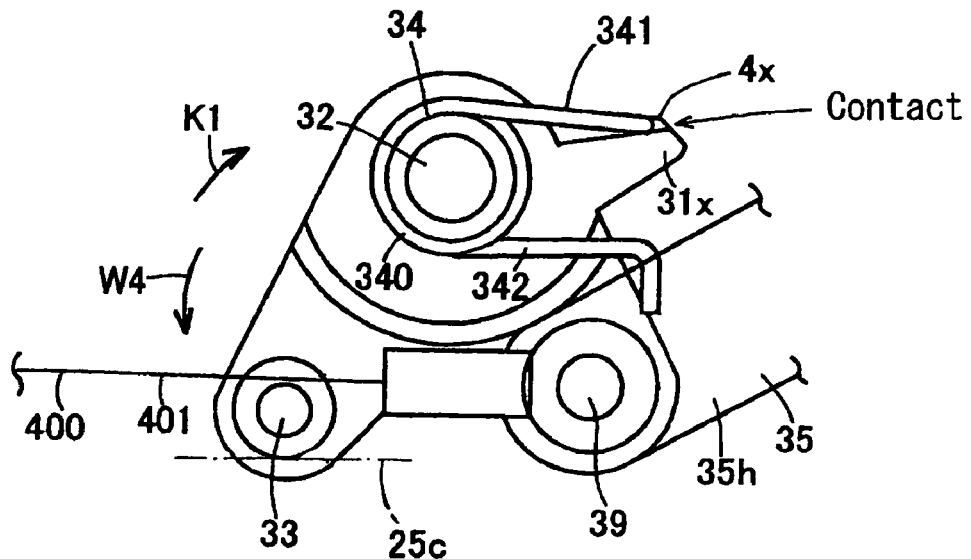
FIG. 12 illustrates a side view indicating a link stopper portion of the first release link contacting an arm portion of a first torsion coil spring.

Further, when the walk-in operation is performed, at the position where the first release link 31 is rotated so as to be in a full-stroke position (unlocking position), the stopper portion 31x of the first release link 31 approaches the arm portion 341 of the first torsion coil spring 34 as illustrated in FIG. 7A, however, the stopper portion 31x does not contact the arm portion 341 of the first torsion coil spring 34. When an excessive stroke is applied to the first release link 31, as shown in FIG. 12, the stopper portion 31x of the first release link 31 contacts the arm 341 of the first torsion coil spring 34. In this way, because the arm 341 functions as a stopper, the first release link 31 is prevented from being excessively rotated. At this point, because the arm portion 341 has a spring-elastic characteristic, the stopper portion 31x of the first release link 31 is prevented from being intensely contacting the arm portion 341. Further, at this point, because an elastic force is generated at the arm portion 341, the first release link 31 is moved toward its initial position.

In the same manner as the main mechanism 100, when the walk-in operation is performed, at a position where the second release link 31S is rotated so as to be in a full-stroke position (unlocking position), the stopper portion 31x of the second release link 31S approaches the arm portion 341 of the second torsion coil spring 34 as illustrated in FIGS. 10C and 11C, however, the stopper portion 31x of the second release link 31S does not contact the arm portion 341 of the second torsion coil spring 34.

Figure 13:
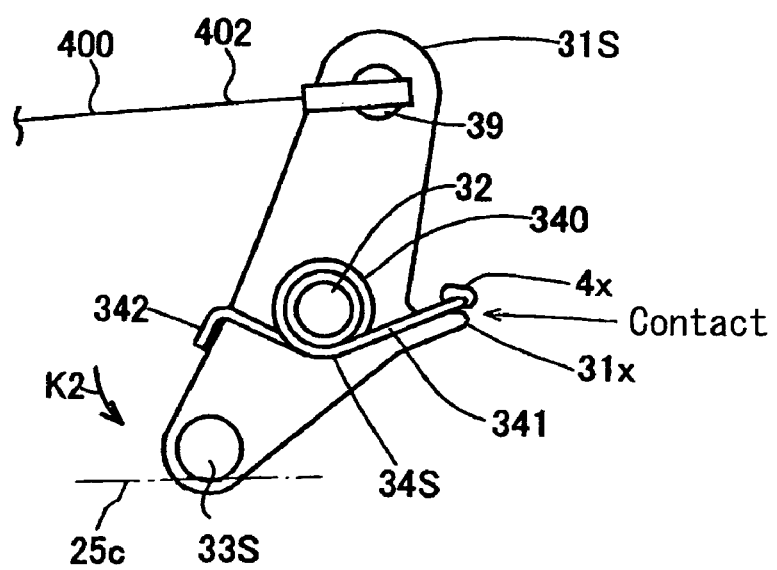
FIG. 13 illustrates a side view indicating a link stopper portion of the second release link contacting an arm portion of a second torsion coil spring.

When an excessive stroke is applied to the second release link 31S, as shown in FIG. 13, the stopper portion 31x of the second release link 31S contacts the arm 341 of the second torsion coil spring 34S. In this way, because the arm 341 functions as a stopper, the second release link 31S is prevented from being excessively rotated. At this point, because the arm portion 341 has a spring-elastic characteristic, the stopper portion 31x of the second release link 31 is prevented from being intensely contacting the arm portion 341. Further, at this point, because an elastic force is generated at the arm portion 341, the second release link 31S is moved toward its initial position.

Described below is a structure around the position memorizing mechanism. As illustrated in FIG. 3, the housing space S is defined at the bottom 12 of the lower rail 3. The rail 46 is secured inside the housing space S and is mounted on the vehicle floor by means of the lower rail 3. The rail 46 includes an approximately ring-shaped cross section and opening ends turned inward in a seat width direction. The rail 46 is positioned to be coaxial with the lower rail 3 and extends along the longitudinal direction of the lower rail 3. Specifically, the rail 46 extends along the longitudinal direction of the vehicle. As illustrated in FIG. 3, hole-shaped lock portions 46a are formed at both ends of the rail 46 in a width direction thereof. The plural lock portions 46a are provided in series and spaced at a predetermined interval along the longitudinal direction of the rail 46. The predetermined interval between the adjacent lock portions 46a is the same as the one of the adjacent lock holes 11a.

As illustrated in FIG. 3, a slider 47, serving as a position memorizing mechanism, is movably provided inside of the rail 46. The slider 47 is accommodated inside the housing space S together with the rail 46. As illustrated in FIG. 14, the slider 47 includes a slider body 48 and an engagement member 49. The engagement member 49 is housed in a recessed portion 48a of the slider body 48. The slider body 48 includes an outer wall surface corresponding to an inner wall surface of the rail 46 and is slidably movable along the rail 46. The recessed portion 48a is opened upward. A spring 50 is provided between an under surface of the engagement member 49 and a bottom surface of the recessed portion 48a in a manner where the spring 50 applies an biasing force to the engagement member 49 so as to project upward, for example an opposite direction to an arrow W6 in FIG. 14.

Figure 14A:
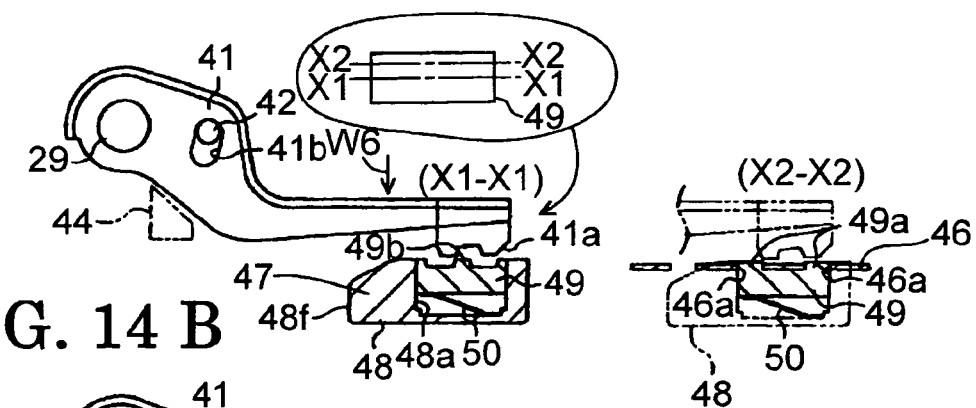

FIGS. 14A, 14B, 14C, and 14D illustrate cross section of the engagement member 49 along a line X1-X1 and cross sections of the engagement member 49 along a line X2-X2. The line X2-X2 is biased to one side of the engagement member 49 in a width direction thereof as illustrated in FIG. 14A. As illustrated in FIG. 14, plural fitting stripes 49a, for example two fitting stripes 49a are formed at the engagement member 49. The fitting strips 49a are engageable with and disengageable from the lock portions 46a of the rail 46. The fitting strips 49a are arranged at both sides of the seat in a width direction thereof. The engagement member 49 is biased by the spring so that the fitting strips 49a are fitted into the lock portions 46a. As a result, the slider 47 is locked and secured relative to the rail 46. The longitudinal position of the slider 47 that has been locked is referred to as a memorized position (a relative position between the lower rail 3 and the upper rail 4) of the seat so that the seat or the upper rail 4 returns to the memorized position of the seat.

As further illustrated in FIG. 14, a locking piece 49b is formed at the engagement member 49 provided so as to be movable. A stopper 51 (see FIG. 2) is fixed to the upper rail 4. The stopper 51 faces a stopper surface 48f of the slider body 48 so as to contact thereto. Therefore, as the upper rail 4 (seat) is moved backward, for example in a direction indicated with an arrow R, the stopper 51 at the side of the upper rail 4 contacts the stopper surface 48f of the slider 47. At this point, the slider 47 has been locked with the lock portion 46a, the upper rail 4 returns to a position that the slider 47 currently memorized therein. Thus, the slider 47 functions as a memory for memorizing a position of the seat.

A canceling lever 41, serving as a canceling member, is provided at an outer surface in a vehicle width direction of the supporting wall 21 of the upper rail 4. The canceling lever 41 cancels the seat position memorized by the slider 47. The canceling lever 41 is supported by the upper rail 4 so as to pivot about the pin 29. The canceling lever 41 is connected to the slide unlock operation lever 28 and is actuated in conjunction with the slide unlock operation lever 28. As illustrated in FIG. 14, an engagement portion 41a is formed at a rear end of the canceling lever 41 in a longitudinal direction.

As illustrated in FIG. 14, a long hole 41b is formed at the canceling lever 41 at a central position in a longitudinal direction thereof so as to extend in a circumferential direction about the pin 29. An engagement pin 42 is firmly provided at the slide unlock operation lever 28. The engagement pin 42 extends through the supporting wall 21 of the upper rail 4 and is inserted into the long hole 41*b*. A relative pivot-movement range of the slide unlock operation lever 28 and the canceling lever 41 is determined by a movement range of the engagement pin 42 within the long hole 41*b*. A spring 43 is provided around the pin 29 and typically biases the canceling lever 41 in a manner where the engagement portion 41*a* of the canceling lever 41 approaches the lower rail 3 (a clockwise direction in FIG. 14, a direction indicated with an arrow W6). Specifically, one end of the spring 43 is fixed to the canceling lever 41, and the other end thereof is fixed to the engagement pin 42. The spring 43 biases in a manner where the engagement pin 42 contacts an inner wall surface at one circumferential side (anticlockwise direction in FIG. 14) of the long hole 41*b*. Thus, the canceling lever 41 is typically biased to rotate in a manner where the engagement potion 41*a* approaches the lower rail 3, as a result, the engagement portion 41*a* detachably engages the engagement pin 42.

As illustrated in FIG. 14, a restriction wall 44, serving as a restricting member, is provided at the upper rail 4. As the canceling lever 41 pivots beyond a predetermined angle in a direction illustrated with an arrow W6, the canceling lever 41 contacts the restriction wall 44, as a result, the restriction wall 44 restricts a further rotation of the canceling lever 41 beyond the predetermined rotation angle.

Figure 14B:
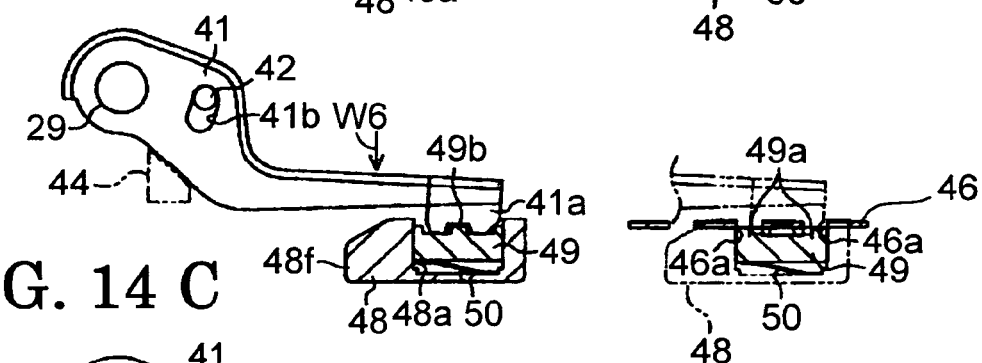
Figure 14C:
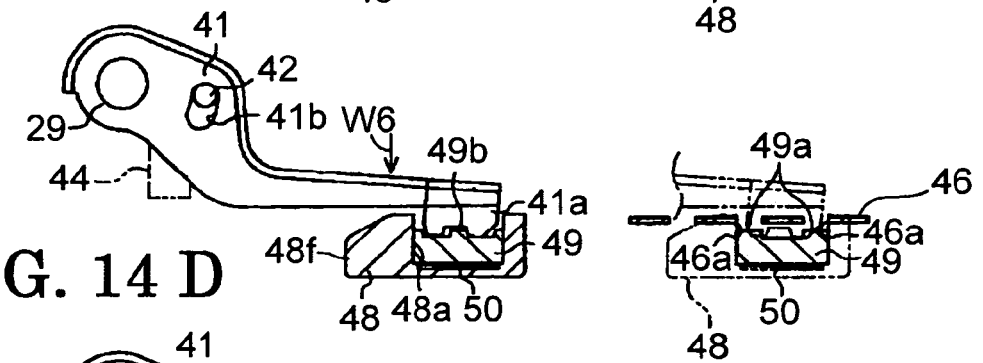

The canceling lever 41 is operated in association with the slide unlock operation lever 28. Therefore, once a user operates an operation handle (not illustrated), the slide unlock operation lever 28 is rotated in an unlocking direction, at the same time, the canceling lever 41 is rotated in a direction for canceling the memory. As illustrated in FIGS. 14A, 14B and 14C, until a pivot movement of the lever is restrained by the restriction wall 44, the canceling lever 41 pivots in association with the slide unlock operation lever 28 while the engagement pin 42 contacts the inner wall surface of the long hole 41*b*.

The engagement portion 41*a* of the canceling lever 41 connected to the upper rail 4 faces the locking piece 49*b* of the engagement member 49 of the slider 47 so as to be engaged therewith. Specifically, the engagement portion 41*a* of the canceling lever 41 is located at a position so as to appropriately press the engagement member 49. As illustrated in FIGS. 14B and 14C, as the slide unlock operation lever 28 is rotated in conjunction with a user's operation of an operation handle, the canceling lever 41 presses the engagement member 49 downward (in a direction indicated with the arrow W6) so as to be disengaged against the biasing force applied by the spring 50. The fitting strips 49*a*, that has been fitted into the lock portions 46*a* of the rail 46, are detached from the lock portions 46*a* so that the slider 47 is unlocked from the rail 46. Specifically, a restraining for a relative movement of the slider 47 relative to the rail 46 is cancel.

According to the embodiment of the present invention, in a state where the upper rail 4 is locked with the lower rail 3 by means of the first slide lock plate 25, the slider 47 is normally fitted into the lock portions 46*a* and is locked by the rail 46. The slider 47 is thus restrained from moving relative to the rail 46. Once the canceling lever 41 is rotated in a direction indicated with the arrow W6 in response to an operation by a user, the engagement portion 41*a* of the canceling lever 41 lifts down the engagement member 49 in the disengagement direction (W6 direction). Therefore, the slider 47 is disengaged from the lock portions 46*a* and becomes movable relative to the rail 46, as a result, the position memorized by the slider 47 is cancel. At this point, because the engagement portion 41*a* of the canceling lever 41 has been engaged with the engagement member 49 of the slider 47, once the upper rail 4 (seat) is moved back and force with the canceling lever 41, the slider 47 is also moved along the rail 46 in association with the canceling lever 41.

Figure 14D:
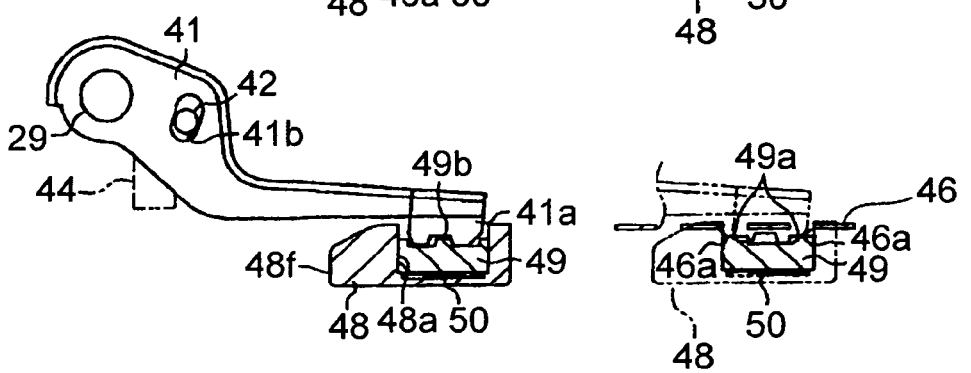

FIG. 14D illustrates a state in which a rotation of the canceling lever 41 is restrained by the restriction wall 44. In this case, the slide unlock operation lever 28 allows the first slide lock plate 25 to rotate in an unlocking direction (a direction indicated with an arrow W2), then the detents 25*a* are disengaged from the lock holes 11*a*.

As described above, at the time of a normal operation such as a seat slide operation, the slide unlock operation lever 28 and the canceling lever 41 are both operated in response to operation of an operation handle (not illustrated) by a user. Specifically. in response to an operation of the slide unlock operation lever 28, the upper rail 4 is unlocked from the lower rail 3, and a relative movement between the lower rail 3 and the upper rail 4 is enabled. Further, in response to an operation of the engagement canceling lever 41, the slider 47 is unlocked from the lock portions 46*a*. Once the upper rail (seat) is moved back and forth, the slider 47 is slidably moved along the rail 46 together with the upper rail 4. This is because the movable locking piece 49*b* of the engagement member 49 of the slider 47 has been engaged with the engagement portion 41*a* of the lever. Therefore, the slider 47 is moved relative to the rail 46 integral with the upper rail 4 and the seat in the same direction.

On the other hand, at the time of the walk-in operation, a user tilts the seat back forward beyond a predetermined angle, and at this point, the slide unlock operation lever 28 is not operated. As described above, the first release lever 31 of the walk-in mechanism MA is rotated in an unlocking direction (in a direction indicated with an arrow W4), and then the upper rail 4 is disengaged from the lower rail 3, as a result, upper rail 4 slides relative to the lower rail 3. While the walk-in operation is performed, because the slide unlock operation lever 28 and the canceling lever 41 are not rotated, the slider 47 remains locked with the lock portions 46*a* and fixed with the rail 46. A relative movement of the slider 47 relative to the rail 46 is prohibited. Therefore, when the walk-in operation is performed, the slider 47 functions to memorize a position of the seat, for example a relative position between the lower rail 3 and the upper rail 4.

At the time of the walk-in operation, the seat, which has been moved forward, for example a direction for increasing a space so that a user smoothly gets in and out of the vehicle, is returned backward in an arrow R direction. In this case, the upper rail 4 (seat) is moved backward (the arrow R) and stopped when the stopper 51 of the upper rail 4 contacts the stopper surface 48*f* of the slider 47. In this manner, a position of the seat, for example a relative position between the lower rail 3 and the upper rail 4, returns to the initial position where the upper rail 4 was located prior to the forward movement of the seat. The engagement portion 41*a* of the canceling lever 41 returns to a position ready for presses and engaging the engagement member 49 of the slider 47.

The present invention is not limited to the above-described embodiment, which is illustrated in the attached drawings. For example, in the embodiment, the contact position PA is defined by the second contact portion of the sub mechanism 300 and the second lock member of the sub mechanism 300, contacting each other, however, a clearance, serving as a second clearance, which is smaller than the clearance E1 defined at the main mechanism 100 may be provided in the sub mechanism 300. Further, in the embodiment, the first torsion coil spring 34 functions as a stopper for limiting the pivotal movement of the first release link 31 and the second torsion coil spring 34S functions as a stopper for limiting the pivotal movement of the second release link 31S, however, at least one of the first torsion coil spring 34 and the second torsion coil spring 34S may be provided.

In the embodiment, the vehicle seat apparatus 1 may includes more than two of the lower rails and the upper rails. The vehicle seat apparatus 1 may includes one lower rail and one upper rail, as long as enough strength and stability is secured in this configuration. In the embodiment, each of the lower rail and the upper rail extends in a front-rear direction of the vehicle so that the seat slides relative to the lower rail in a front-rear direction of the vehicle, however, each of the lower rail and the upper rail may extend in a width direction of the vehicle, and the seat may slide in a vehicle width direction. In the embodiment, at the time of the walk-in operation, a front seat is moved forward, however, this configuration is an example and any seat can be moved in order to increase a space within the vehicle. For example, a rear seat may be moved backward in order to increase a space between the front seat and the rear seat.

In the embodiment, in stead of the first drive link 35 actuated in response to the tilting operation of the seat back of the seat, a flexible cord-shaped member such as a cable may be used. In the embodiment, the main mechanism 100, the sub mechanism 300 and the transmitting mechanism (cable 400) are provided, however, the sub mechanism 300 and the transmitting mechanism may not be provided, and only the main mechanism 100 may be provided. For example, a single mechanism (main mechanism 100) is provided at each side of the vehicle seat in order to unlock both of the first lock member and the second lock member in response to the tilting operation of the seat back of the seat.

According to the embodiment, the first release link is rotatably connected by means of the link connecting shaft to the first drive member, and further, one end portion in a longitudinal direction of the flexible cord-shaped member such as a cable is connected to the link connecting shaft.

Thus, the first release link does not include a portion for connecting the flexible cord-shaped member thereto, in other words, the first release link doesn't need to be changed in shape in order to connect the flexible cord-shaped member thereto for interlocking each other. In this configuration, a mechanism for transmitting the operation of the first release link to the second release link can be downsized, and a loss in the transmission can be reduced. Further, a space for the first release link and the second release link are reduced, as a result, the costs can be reduced At the time of the walk-in operation, the operation of the first release link is transmitted to the second release link. Generally, at this point, a loss in the transmitted operation may occur because of, for example, a size tolerance, a clearance tolerance, an assembling tolerance, and a looseness of the flexible cord-shaped member. Thus, the actuation of the second release link of the sub mechanism may delay comparing to the actuation of the first release link of the main mechanism.

According to the embodiment, at the initial position of the walk-in operation, at the main mechanism, the first biasing member applies a biasing force to the first release link so as to rotate in an opposite direction of the unlocking direction. At the sub mechanism, the second biasing member applies a biasing force to the second release link so as to rotate in an unlocking direction. In this configuration, the second release link of the sub mechanism is prevented from being delayed from the actuation of the first release link, as a result, the sub mechanism is prevented form being delayed from the main mechanism.

Further, the transmitting mechanism is not limited to the above mentioned flexible cord-shaped member such as a cable. For example, instead of the flexible cord-shaped member, a rod may be provided between the main mechanism and the sub mechanism in order to transmit an operation of the main mechanism to the sub mechanism. In this configuration, the link connecting shaft, which is used for connecting the first release link to the first drive member, may connect the rod to the first release link so as to be coaxial or approximately coaxial.

Even when an excessive stroke is applied to the first release link, in the configuration described in the embodiment, the first release link is prevented from being rotated excessively. Thus, the walk-in device is performed appropriately. Further, the walk-in device may not include one of/each of the sub mechanism and the transmitting mechanism. In this configuration, the main mechanism may be provided at one side of the seat in a seat width direction, or may be provide at both side of the seat in a seat width direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle walk-in device comprising;
a fixed rail on which a seat slides;
a first lock member provided at one side of the seat in a seat width direction for locking the seat so as not to slide relative to the fixed rail and for unlocking the seat so as to slide relative to the fixed rail;
a second lock member provided at the other side of the seat in the seat width direction for locking the seat so as not to slide relative to the fixed rail and for unlocking the seat so as to slide relative to the fixed rail;
a main mechanism provided at the one side of the seat and unlocking the first lock member in conjunction with an operation of a seat back of the seat;
a sub mechanism provided at the other side of the seat and unlocking the second lock member in conjunction with an actuation of the main mechanism;
a transmitting mechanism provided between the main mechanism and the sub mechanism and transmitting an operation of the main mechanism to the sub mechanism;
the main mechanism including:
a first drive member actuated in conjunction with the operation of the seat back of the seat,
a first release link actuated in conjunction with the first drive member so as to press the first lock member to be unlocked; and
a link connecting shaft by which the first drive member is relative-rotatably connected to the first release link:
the sub mechanism including a second release link actuated in conjunction with the first release link by means of the transmitting mechanism so that the second lock member is pressed so as to be unlocked;
the transmitting mechanism made of a flexible cord-shaped member and disposed in a manner where one end of the flexible cord-shaped member in a longitudinal direction thereof is connected to the link connecting shaft used for connecting the first drive member and the first release link in the main mechanism, and the other end of the flexible cord-shaped member in a longitudinal direction thereof is connected to the second release link of the sub mechanism;

the main mechanism including a first biasing member biasing the first release link in an opposite direction of an unlocking direction, and the sub mechanism includes a second biasing member biasing the second release link in the unlocking direction; and wherein the first release link of the main mechanism includes a first contact portion pressing the first lock member so as to be unlocked, the second release link of the sub mechanism includes a second contact portion pressing the second lock member so as to be unlocked, at an initial position of an unlocking operation, a first clearance is defined between the first contact portion and the first lock member in the main mechanism, and at the initial position of the unlocking operation, the sub mechanism is configured in a manner where, one of: the second contact portion contacts the second lock member in the sub mechanism; and a second clearance, which is smaller than the first clearance, is defined between the second contact portion and the second lock member in the sub mechanism.

2. The vehicle walk-in device according to claim 1, wherein one of/each of the first biasing member and the second biasing member serves as a stopper for restricting one of/each of the first release link and the second release link so as not to be rotated excessively.

3. The vehicle walk-in device according to claim 2, wherein one of/each of the first biasing member and the second biasing member includes a torsion coil spring having a coil spring and an arm portion formed so as to continue to the coil spring, and the arm portion of the torsion coil spring serves as a stopper for restricting one of/both of the first release link and the second release link so as not to be rotated excessively.

4. The vehicle walk-in device according to claim 3, wherein one of/each of the first release link and the second release link includes a link stopper portion contacting the arm portion of the torsion coil spring.

5. A vehicle walk-in device comprising:

a fixed rail on which a seat slides;

a first lock member provided at one side of the seat in a seat width direction for locking the seat so as not to slide relative to the fixed rail and for unlocking the seat so as to slide relative to the fixed rail;

a second lock member provided at the other side of the seat in a seat width direction for locking the seat so as not to slide relative to the fixed rail and for unlocking the seat so as to slide relative to the fixed rail;

a main mechanism provided at the one side of the seat and unlocking the first lock member in conjunction with an operation of a seat back of the seat;

a sub mechanism provided at the other side of the seat and unlocking the second lock member in conjunction with an actuation of the main mechanism;

a transmitting mechanism provided between the main mechanism and the sub mechanism and transmitting an operation of the main mechanism to the sub mechanism;

the main mechanism including:

a first drive member actuated in conjunction with the operation of the seat back of the seat, a first release link actuated in conjunction with the first drive member so as to press the first lock member to be unlocked;

a link connecting shaft by which the first drive member is relative-rotatably connected to the first release link; and a first biasing member biasing the first release link in an opposite direction of an unlocking direction: and the sub mechanism including:

a second release link actuated in conjunction with the first release link by means of the transmitting mechanism so that the second lock member is pressed so as to be unlocked; and a second biasing member biasing the second release link in the unlocking direction;

wherein the first release link of the main mechanism includes a first contact portion pressing the first lock member so as to be unlocked, the second release link of the sub mechanism includes a second contact portion pressing the second lock member so as to be unlocked, at an initial position of an unlocking operation, a first clearance is defined between the first contact portion and the first lock member in the main mechanism, and at the initial position of the unlocking operation, the sub mechanism is configured in a manner where, one of: the second contact portion contacts the second lock member in the sub mechanism; and a second clearance, which is smaller than the first clearance is defined between the second contact portion and the second lock member in the sub mechanism.

6. The vehicle walk-in device according to claim 5, wherein one of/each of the first biasing member and the second biasing member includes a torsion coil spring having a coil spring and an arm portion formed so as to continue to the coil spring, and the arm portion of the torsion coil spring serves as a stopper for restricting one of/both of the first release link and the second release link so as not to rotate excessively.

7. The vehicle walk-in device according to claim 6, wherein one of/each of the first release link and the second release link includes a link stopper portion contacting the arm portion of the torsion coil spring.

* * * * *